L. F. DAVIS & O. P. BEAGLE.
Harrows.
No. 133,308.                                           Patented Nov. 26, 1872.
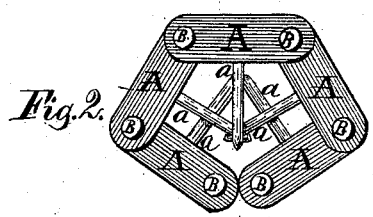
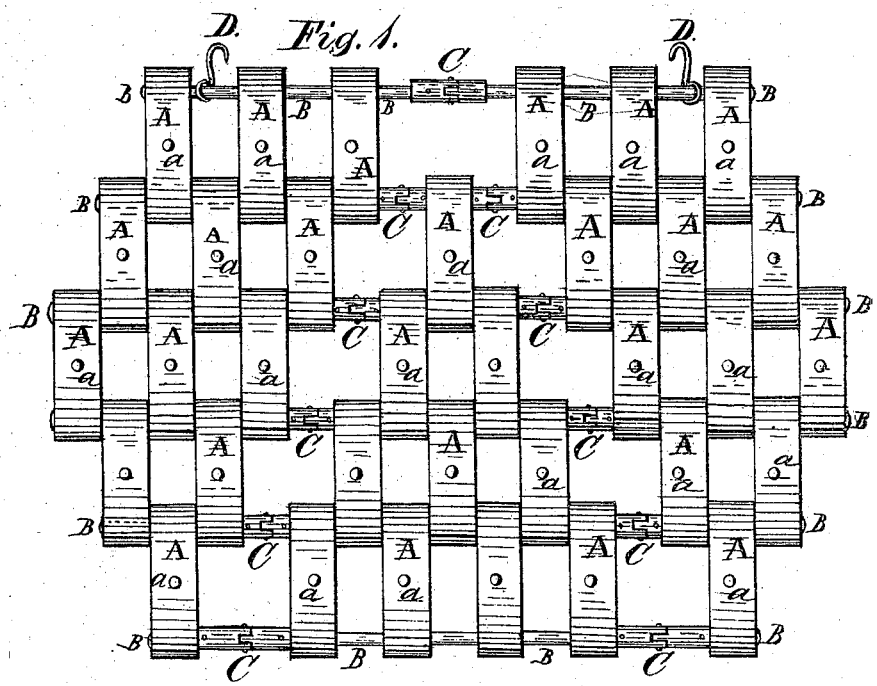

UNITED STATES PATENT OFFICE.

LINUS F. DAVIS AND OBED P. BEAGLE, OF ALTONA, ILLINOIS.

IMPROVEMENT IN HARROWS.

Specification forming part of Letters Patent No. 133,308, dated November 26, 1872.

*To all whom it may concern:*

Be it known that we, LINUS F. DAVIS and OBED P. BEAGLE, of Altona, county of Knox and State of Illinois, have invented certain Improvements in Harrows, of which the following is a specification:

Nature and Objects of the Invention.

The nature of our invention relates to improvements in that class of harrows which are made in sections; and the invention consists in the peculiar arrangement of the joints in the rods which hold the sections together, in such manner that when one part of the harrow is raised from the ground in passing over some obstruction other parts may remain in contact with the soil, all as hereinafter fully described.

Description of the Accompanying Drawing.

Figure 1 is a top view of our invention. Fig. 2 is a rear view, showing the harrow folded for transportation.

General Description.

Letters A represent the sections, of which there may be any desired number, each one furnished with a tooth, *a*. Letters B represent the rods, which pass through the ends of the sections, as shown, and loosely, so that the sections may have freedom to rise in passing over obstructions. Letters C represent joints in the rods B, commencing at the center of the forward rod with one joint, and passing back with two in each rod, arranged diagonally with the harrow, as plainly shown at Fig. 1. The sections A are also arranged, as shown at Fig. 1, so as to leave spaces for the joints C where they occur. D D are hooks, to which devices may be attached, for connecting the draft animals with the harrow.

The operation of our invention is as follows: The harrow is drawn forward by the side having the hooks D D, and in passing over clods, stalk-roots, and similar obstructions the harrow may rise in transverse elevations over either rod B, while the portion in rear remains in contact with the soil, and the joints C will allow flexibility in the other direction, and their arrangement diagonally will prevent any portion of the harrow being raised in rear by any one joint passing over an obstruction, as will be plainly seen on reference to the drawing.

We are aware that harrows constructed with sections like ours have before been used, and that such sections have been united by hinged joints arranged in straight or parallel lines. We do not, therefore, claim such arrangement as our invention.

What we claim is—

The jointed rods B having the hinges or joints C arranged diagonally, as shown and described, in combination with the sections A, articulated on the rods B, and having teeth *a*, for the purpose specified.

LINUS F. DAVIS.
OBED P. BEAGLE.

Witnesses:
CLARISSA BUFFUM,
MATHILDA SAMULSON.